United States Patent
Blocksome

(10) Patent No.: US 8,488,658 B1
(45) Date of Patent: Jul. 16, 2013

(54) TRANSMITTER LINEARIZATION TECHNIQUE

(75) Inventor: Roderick K. Blocksome, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 342 days.

(21) Appl. No.: 12/885,114

(22) Filed: Sep. 17, 2010

(51) Int. Cl.
*H04B 1/38* (2006.01)

(52) U.S. Cl.
USPC .......................................................... 375/222

(58) Field of Classification Search
USPC .......................................................... 375/222
See application file for complete search history.

(56) References Cited

U.S. PATENT DOCUMENTS

| 6,389,068 | B1* | 5/2002 | Smith et al. | 375/225 |
| 6,456,823 | B1* | 9/2002 | Black | 455/3.01 |
| 6,724,836 | B1* | 4/2004 | Graf et al. | 375/334 |
| 2007/0182604 | A1* | 8/2007 | Aerts et al. | 341/118 |

\* cited by examiner

*Primary Examiner* — Leon-Viet Nguyen
(74) *Attorney, Agent, or Firm* — Donna P. Suchy; Daniel M. Barbieri

(57) ABSTRACT

According to one exemplary embodiment of the present disclosure, a method for improving linearization of a transmitter comprising transmitting, using the transmitter, a predetermined signal. The method further comprises receiving, using a receiver, the predetermined signal transmitted by the transmitter. The method further comprises determining, using a modem, one or more differences between the transmitted predetermined signal and the received predetermined signal. The differences are in at least one of a phase and an amplitude of at least a portion of the signal. The method further comprises altering, using the modem, at least one signal being transmitted over the transmitter based on the determined differences.

20 Claims, 3 Drawing Sheets

TRANSMITTER LINEARIZATION TECHNIQUE

BACKGROUND

The present disclosure relates generally to the field of signal transmission and processing systems.

Transmitters may be used in a variety of communication systems (e.g., military systems) to transmit signals (e.g., wireless signals, wired signals, etc.) from one location to another. Transmitters may include and/or be coupled to power amplifiers that are configured to increase the power of a signal being transmitted. Such power amplifiers are typically not perfectly linear and may introduce noise and/or other distortion into the transmitted signal. Distortion attributable to a transmitter and/or power amplifier may cause an incorrect signal and/or incorrect data to be received when a receiver obtains the signal, particularly in the case of high density transmitted waveforms.

SUMMARY

According to one exemplary embodiment of the present disclosure, a method for improving linearization of a transmitter comprising transmitting, using the transmitter, a predetermined signal. The method further comprises receiving, using a receiver, the predetermined signal transmitted by the transmitter. The method further comprises determining, using a modem, one or more differences between the transmitted predetermined signal and the received predetermined signal. The differences are in at least one of a phase and an amplitude of at least a portion of the signal. The method further comprises altering, using the modem, at least one signal being transmitted over the transmitter based on the determined differences.

According to another exemplary embodiment of the present disclosure, a system for transmitting data comprises a transmitter configured to transmit a predetermined signal. The system further comprises a receiver configured to receive the predetermined signal. The system further comprises a modem configured to determine one or more differences between the transmitted predetermined signal and the received predetermined signal. The differences are in at least one of a phase and an amplitude of at least a portion of the signal. The modem is further configured to alter at least one signal being transmitted over the transmitter based on the determined differences.

According to yet another exemplary embodiment of the present disclosure, a method for improving linearization of a transmitter comprises transmitting, using the transmitter, a predetermined pattern of symbols. The predetermined pattern of symbols are transmitted upon detection of a rechanneling procedure. The method further comprises receiving, using a receiver, the predetermined pattern of symbols transmitted by the transmitter. The method further comprises determining, using a modem, one or more differences between the transmitted predetermined pattern of symbols and the received predetermined pattern of symbols. The differences are in at least one of a phase and an amplitude of at least one of the symbols. The method further comprises determining, using the modem, one or more correction values based on the determined differences. One or more symbols being transmitted over the transmitter are altered based on the determined differences.

Other aspects and advantages of the present disclosure will become apparent from the following detailed description, taken in conjunction with the accompanying drawings, illustrating the principles of the disclosure by way of example only.

BRIEF DESCRIPTION OF THE DRAWINGS

Various embodiments taught herein are illustrated by way of example, and not by way of limitation, in the figures of the accompanying drawings, in which.

It will be recognized that some or all of the figures are schematic representations for purposes of illustration and do not necessarily depict the actual relative sizes or locations of the elements shown. The figures are provided for the purpose of illustrating one or more embodiments of the disclosure with the explicit understanding that they will not be used to limit the scope or the meaning of the claims.

DETAILED DESCRIPTION

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the figures, systems and methods are provided for improving the linearity of transmitters and/or power amplifiers. In various embodiments, the systems and methods provided may improve the amplitude and/or phase linearity of the transmitted signal without requiring substantial changes to a typical transmitter or power amplifier. In some embodiments, provided methods may be implemented in existing modem hardware and/or software resulting in substantial cost savings when moving to wideband high frequency high speed data capability. In various embodiments, flexibility of the methods provided may allow implementation in a wide variety of different types of high frequency equipment and/or systems (e.g., airborne or vehicular transceivers, ground or shipboard transceivers, ground or shipboard split-site transmitters and receivers, etc.).

Figure 1:
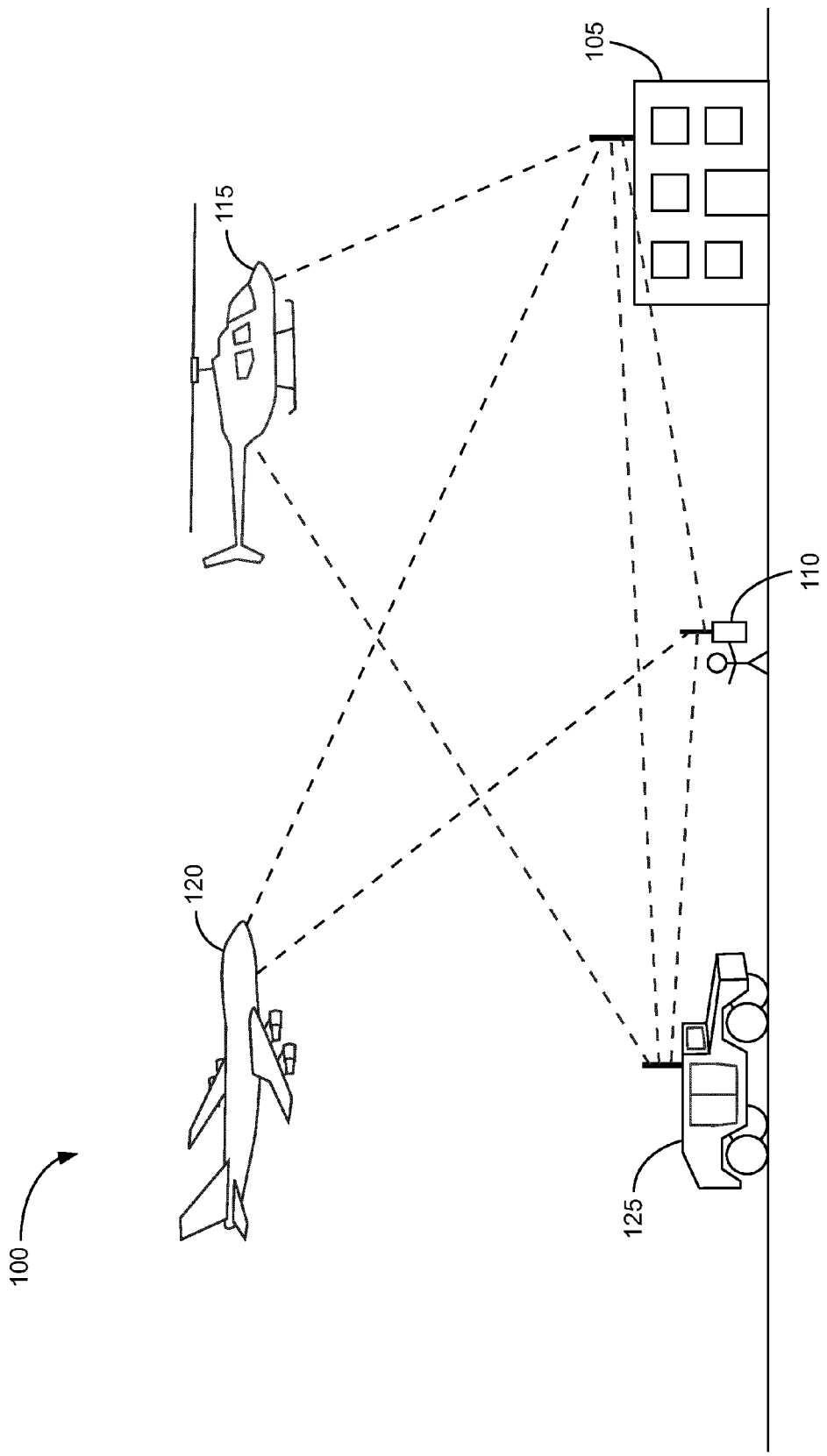
FIG. 1 is a diagram illustrating a communication network according to an exemplary embodiment.

Referring now to FIG. 1, a diagram of a communication network 100 is shown according to an exemplary embodiment. Communication network 100 may be a military communication network. Communication network 100 may include any of a variety of features (e.g., wireless, ad-hoc connection, etc.). In some embodiments, components of communication network 100 may communicate using radio frequency (RF) signals. As illustrated, communication network 100 includes transceivers (e.g., transmitters and/or receivers) associated with a ground station 105 (e.g., base station, command station, etc.), ground unit 110 (e.g., handheld radio, mobile communication device, etc.), aircraft (e.g., helicopter 115, airplane 120, etc.), and a ground vehicle 125 (e.g., car, truck, etc.). In various exemplary embodiments, a communication network may include fewer, additional, or different components than those illustrated in FIG. 1.

In various embodiments, various components of communication network 100 may communicate using high frequency (HF) radio channels. Non-linearity of transmitter amplifiers can lead to intermodulation distortion (IMD), or unwanted amplitude and/or phase modulation, of the transmitted signals. Military Standard 188-141B (MIL-STD-188-141B) is the U.S. Department of Defense standard governing HF radio systems, and is hereby incorporated by reference in its entirety. MIL-STD-188-141B specifies that the two-tone IMD must be a minimum of −30 decibels (dB) below either tone for fixed/transportable HF radios and −24 dB below either tone for tactical HF radios. These specification limits may be adequate for HF single sideband modulation (SSB) voice and low data rate waveforms.

The distortion associated with an HF transmitter becomes more important as the speed of transmission and/or symbol density of the data waveform being transmitted increases. For example, the IMD performance of an HF transmitter may be more important for high speed data transmission applications where high symbol density quadrature amplitude modulation (QAM) waveforms are being transmitted. It is desirable to transmit the "cleanest" signal, or a signal with as little distortion attributable to the transmitter and/or associated power amplifier, possible. The HF channel may introduce an uncontrolled distortion to the data waveform. By transmitting a clean signal, a receiver obtaining the signal may have to account for the HF channel distortions but not a substantial amount of distortion due to the transmitter and/or associated power amplifier.

QAM waveforms transmit data using a set of symbols (collectively called a constellation of symbols). For example, 64 QAM waveforms utilize 64 distinct symbols or points to transmit data, 128 QAM waveforms utilize 128 distinct symbols, 256 QAM waveforms utilize 256 distinct symbols, and so on. Each symbol may represent a particular phase and amplitude of the transmitted signal at a particular point in time.

As QAM waveforms increase in symbol density, more symbols or points are closer together within the constellation (e.g., such that there are smaller phase and/or amplitude increments between symbols). Accordingly, noise and other distortion can induce reception errors in high density QAM waveforms and other types of high density signals. High density QAM waveforms (e.g., up to 256 QAM) have been shown to be capable of successful transmission over the air using a 1 kilowatt (kW) solid state power amplifier with a nominal two-tone IMD of −30 dB. However, a higher signal-to-noise ratio (SNR) may be required at a modem associated with the receiver for such a power amplifier than if the signal were transmitted using a power amplifier with an IMD of −40 dB or better. For a particular received data error level (e.g., a particular received data bit error rate (BER)), a −30 dB IMD transmitter at a particular output power level is generally equivalent to a −40 dB IMD transmitter at a lower power level.

Several techniques may be used to improve the linearity of an HF power amplifier. One technique is to use a tuned vacuum tube power amplifier operated in Class AB or B. Class A amplifiers amplify the entire input wave is approximately a scaled-up replica of the input wave. Class B amplifiers amplify only half of the input wave but are substantially more efficient than Class A amplifiers. Class AB amplifiers amplify half of the input wave, like Class B amplifiers, but also amplify a small amount on the other half of the input wave. Class AB amplifiers provide lower IMD performance but greater efficiency than Class A amplifiers, and higher IMD performance but lower efficiency than Class B amplifiers.

A tuned vacuum tube amplifier operated in Class AB or B may achieve −40 dB IMD with good efficiency by the use of negative RF feedback. However, the tuning operation required to operate such an amplifier may make the amplifier slow to respond in Automatic Link Establishment (ALE) systems. Also, solid state power amplifiers typically exhibit greater reliability than vacuum tube amplifiers. Accordingly, vacuum tube technology is largely obsolete in favor of solid state amplifiers for HF power amplifiers in communications applications.

Another technique for improving linearity of an HF power amplifier is to operate the HF amplifier in Class A. Operation in Class A (e.g., for either vacuum tube or solid state amplifiers) provides better IMD performance as compared to operation in Class AB or B. However, class A has substantially lower efficiency than Class AB or B. Class A amplifiers may be larger, heavier, and/or draw more prime power than a Class AB or B amplifier of equivalent radio frequency output power.

Other techniques for improving linearity of an HF power amplifier may involve using various feedback and/or feedforward techniques to linearize an amplifier. Some such techniques have been implemented at frequency ranges and/or power levels different from those encountered for HF communications. Some or all of those techniques may be insufficient and/or cost prohibitive for power amplifiers operated in the frequency ranges and/or power levels involved for HF communications.

Figure 2A:
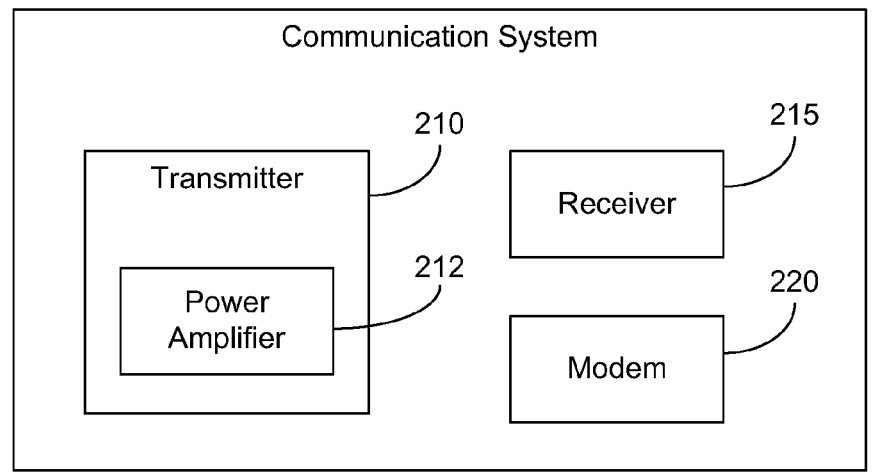
FIGS. 2A and 2B are block diagrams illustrating communication systems according to exemplary embodiments.
Figure 2B:
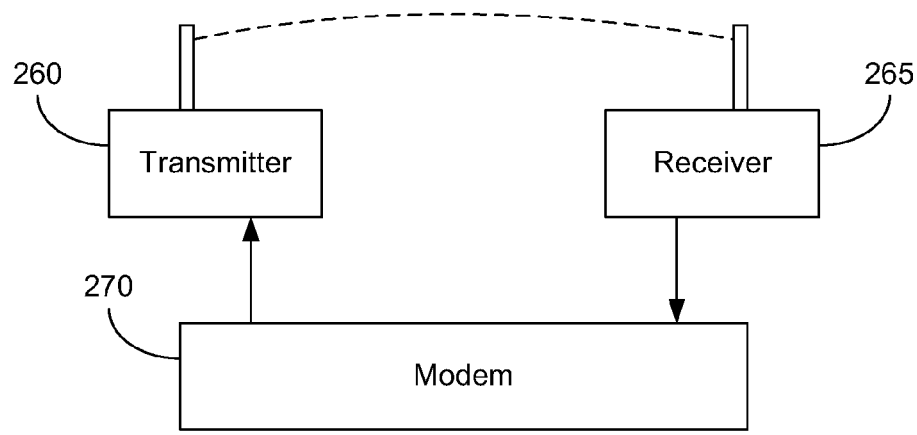
Figure 3:
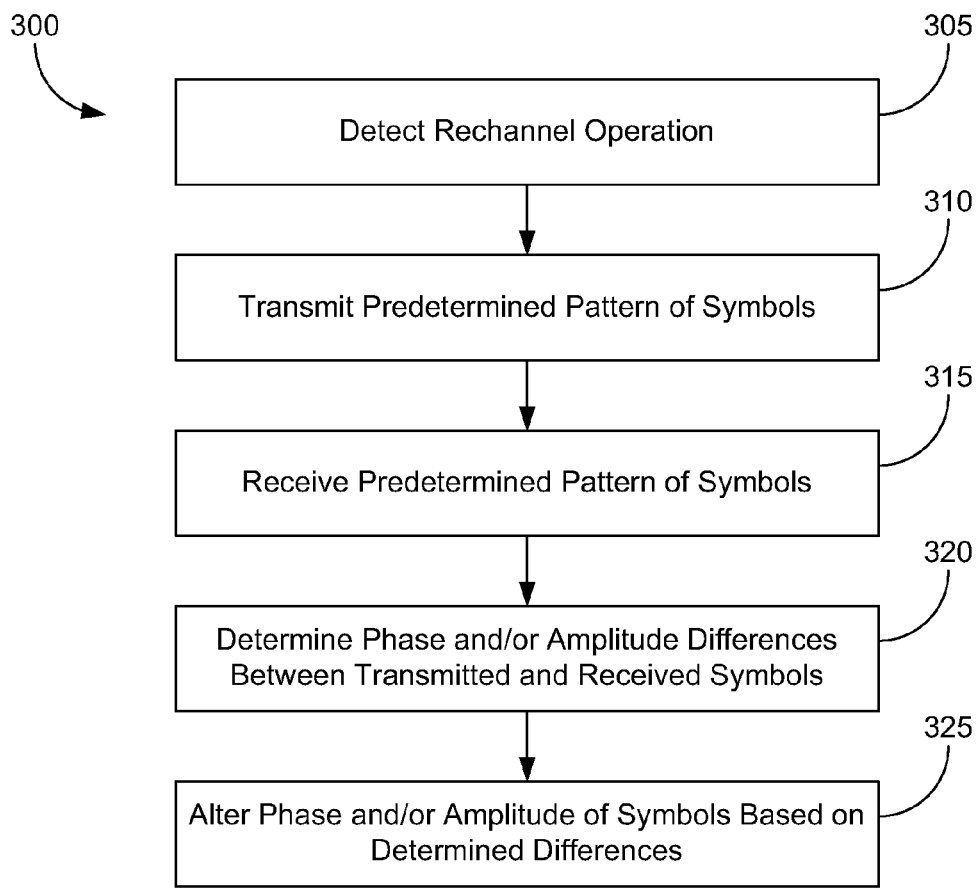
FIG. 3 is a flow diagram of a process for improving the linearity of a transmitter according to an exemplary embodiment.

Other systems and/or methods for improving linearity in an HF power amplifier, discussed in detail herein with reference to exemplary embodiments illustrated in FIGS. 2A, 2B, and 3, may involve compensation in the transmitter to account for the distortion introduced by the transmitter and/or power amplifier. Such techniques may effectively improve the amplitude and/or phase linearity of an HF transmitter without requiring substantial changes in the typical power amplifier (e.g., solid state HF power amplifier). Such techniques may provide the option of reducing the HF power amplifier power level (e.g., as compared to MIL-STD-188-141B IMD compliant power amplifiers) for the same over-the-air bit error rate.

Referring now to FIG. 2A, a block diagram of a communication system 200 is shown according to an exemplary embodiment. Communication system 200 may be implemented in an RF radio unit. System 200 includes a transmitter 210 configured to transmit signals (e.g., QAM waveforms) and a power amplifier 212 configured to amplify signals prior to transmission. System 215 also includes a receiver 215 configured to receive signals sent by one or more transmitters. System 215 also includes a modem 220 electrically coupled and/or connected to transmitter 210 and/or receiver 215 (e.g., as part of a single transceiver unit) and configured to modulate a carrier signal to be sent by transmitter 210 to encode information (e.g., digital data) and/or demodulate a signal received by receiver 215 to decode information.

In some embodiments, transmitter 210 may from time to time (e.g., periodically, at predetermined times, after a certain transmission time, automatically by a computer system or manually by a human operator, etc.) be set to a new frequency and/or emission mode by using a rechanneling procedure. Typically, when a transmitter is keyed or activated for transmission, the associated receiver is deactivated (e.g., muted) to prevent feedback of the voice modulation and/or other undesirable effects. In some embodiments, receiver 215 may be left active (e.g., un-muted) during a rechanneling operation of transmitter 210.

Referring now to FIG. 2B, a diagram of a communication system 250 is shown according to an exemplary embodiment. Communication system 250 includes a transmitter 260, a receiver 265, and a modem 270 associated with (e.g., electrically coupled, such as via a wired or wireless connection) both transmitter 260 and receiver 265.

The linearity of transmitter 260 may be improved (and/or an associated power amplifier) by generating a predetermined signal using modem 270, transmitting the predetermined signal via transmitter 260, receiving the predetermined signal via receiver 265, and analyzing the received signal using modem 270 to determine any distortions introduced by transmitter 260. In the exemplary embodiment described with reference to FIG. 2B, the signals transmitted via transmitter 260 are QAM waveforms (e.g., high density QAM waveforms, such as 128 QAM, 256 QAM, etc.). In other embodiments, other types of signals may be transmitted via transmitter 260; all such signals are within the scope of the present disclosure.

In some embodiments (e.g., if the emission mode is to be wideband HF, such as 3 kHz, 6 kHz, 9 kHz, 12 kHz, etc. bandwidths), modem 270 may direct transmitter 260 to transmit (e.g., sequentially) a predetermined pattern of symbols (e.g., QAM symbols). In some embodiments, modem 270 may detect a rechanneling operation being performed on transmitter 260 and direct transmitter 260 to transmit the predetermined pattern of symbols (e.g., transmit a modulated carrier signal based on the predetermined pattern of signals) during or after (e.g., immediately after, within a predetermined period of time after, etc.) the rechanneling operation. In some embodiments, modem 270 may utilize a tune command to direct transmitter 260 to transmit the predetermined pattern of symbols. In various embodiments, modem 270 may utilize a period of time after the rechanneling procedure is complete and before transmission is re-enabled to transmit the predetermined pattern of symbols, manipulate transmitter 260 and/or a control computer to extend the time before transmission is re-enabled to transmit the predetermined pattern of symbols, etc. In various embodiments, the predetermined pattern may include all symbols in the QAM waveform (e.g., 256 symbols for 256 QAM), a portion or subset of the symbols, all waveforms in the family of auto-baud waveforms, a subset of waveforms in the family of auto-baud waveforms, etc. The predetermined pattern of symbols is then transmitted by transmitter 260. In some embodiments, a power amplifier associated with transmitter 260 may be used to amplify the signals prior to or during transmission). Receiver 265 may be left un-muted during transmission of the signal.

Un-muted receiver 265 may receive the signal including the predetermined pattern of symbols, and modem 270 may demodulate the signal. Modem 270 may be configured to determine any phase and amplitude differences between the transmitted symbols and received symbols. The differences between the transmitted symbols and received symbols may be related to, attributable to, represent, etc. distortions caused by transmitter 260 and/or its power amplifier. Modem 270 may alter the phase and/or amplitude of each symbol (e.g., during future transmissions) based on the determined differences (e.g., as represented by correction values) to compensate for the transmitter distortions. In some embodiments, the correction values may be applied to all data transmissions until a new rechanneling command is detected, at which point the linearization process may be repeated and new correction values may be obtained. Recalculating the correction values upon rechanneling may ensure that any changes in transmitter phase and amplitude linearity with frequency are compensated.

In some embodiments, a communication system may be a HF half-duplex system (e.g., a system with only a transmitter and not a receiver). To utilize the linearization technique, a HF receiver may be added to the communication system. In some embodiments, one receiver may be used to service a plurality of transmitters as the receiver is only utilized by the linearization process during a rechanneling procedure. Because rechanneling procedures are typically brief, conflicts between two transmitters and/or modems attempting to simultaneously utilize the receiver may be relatively rare. In some embodiments, automatic switching of the local receiver between different transmitters and/or modems may be implemented as part of the architecture of the communication system.

Referring now to FIG. 3, a flow diagram of a process 300 for improving the linearity of a transmitter is shown according to an exemplary embodiment. Process 300 may be performed by a communication system such as system 200 and/or system 250 (e.g., including a transmitter, receiver, and modem). The modem may be configured to begin a linearization procedure upon detecting a rechanneling operation of the transmitter (step 305). The modem may be configured to cause the transmitter to transmit a predetermined pattern of symbols (e.g., on a modulated carrier signal) (step 310). The receiver may be left un-muted while the predetermined pattern of symbols is being transmitted.

The receiver may be configured to receive the predetermined pattern of symbols from the transmitter (step 315) and the modem may be configured to demodulate the signal carrying the predetermined pattern of symbols. The modem may be configured to determine any phase and/or amplitude differences between the transmitted symbols and received symbols (e.g., for each symbol) (step 320). The modem may save the differences (e.g., in a memory) as one or more correction factors or values. The modem may be configured to alter the phase and/or amplitude of one or more of the symbols (e.g., in future transmissions) based on the determined amplitude and/or phase differences (step 325).

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hard-wired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method for improving linearization of a transmitter, comprising:
   transmitting, using the transmitter, a predetermined signal, the predetermined signal being generated by a modem that is electrically coupled to both the transmitter and a receiver, the transmitter including a power amplifier having a non-linearity characteristic;
   receiving, using the receiver, the predetermined signal transmitted by the transmitter; and
   determining, using a modem, one or more differences between symbols of the transmitted predetermined signal and symbols of the received predetermined signal, the differences being in at least one of a phase and an amplitude of at least a portion of the predetermined signal; and
   altering, using the modem, symbols being transmitted by the transmitter based on the determined differences to improve the non-linearity characteristic of the transmitter wherein altering includes adjusting at least one symbol associated with the predetermined signal.

2. The method of claim 1, wherein the predetermined signal is a predetermined pattern of QAM symbols.

3. The method of claim 2, wherein the predetermined pattern of QAM symbols includes all symbols in a QAM constellation.

4. The method of claim 2, wherein determining one or more differences between the transmitted wireless predetermined signal and the received wireless predetermined signal comprises determining a difference between each transmitted QAM symbol and a corresponding received QAM symbol.

5. The method of claim 4, wherein altering at least one signal being transmitted over the transmitter comprises altering each QAM symbol in the signal being transmitted based on the determined difference associated with a corresponding QAM signal in the predetermined pattern of QAM symbols.

6. The method of claim 1, further comprising detecting a rechanneling procedure of the transmitter, wherein the predetermined signal is transmitted upon detection of the rechanneling procedure.

7. The method of claim 1, wherein a communication system comprises the transmitter and modem, wherein the receiver is added to the communication system to enable receipt of the predetermined signal.

8. The method of claim 7, wherein the transmitter is one of a plurality of transmitters and the modem is on of one or more modems, wherein the receiver is configured to receive signals from each of the plurality of transmitters and enable the one or more modems to perform the determining and altering operations for the plurality of transmitters.

9. A system for transmitting data, comprising:
a transmitter configured to transmit a predetermined signal including symbols;
a receiver configured to receive the predetermined signal; and
a modem configured to determine one or more differences between the symbols of the transmitted predetermined signal and symbols of the received predetermined signal, the differences being in at least one of a phase and an amplitude of at least a portion of the predetermined signal, and alter at least one signal being transmitted over the transmitter based on the determined differences to reduce non-linearity caused by a power amplifier of the transmitter,
wherein the transmitter, receiver, and modem are part of a transceiver unit.

10. The system of claim 9, wherein the predetermined signal is a predetermined pattern of QAM symbols.

11. The system of claim 10, wherein the predetermined pattern of QAM symbols includes all symbols in a QAM constellation.

12. The system of claim 10, wherein determining one or more differences between the transmitted predetermined signal and the received predetermined signal comprises determining a difference between each transmitted QAM symbol and a corresponding received QAM symbol.

13. The system of claim 12, wherein altering at least one signal being transmitted over the transmitter comprises altering each QAM symbol in the signal being transmitted based on the determined difference associated with a corresponding QAM signal in the predetermined pattern of QAM symbols.

14. The system of claim 9, wherein the modem is configured to detect a rechanneling procedure of the transmitter, wherein the predetermined signal is transmitted upon detection of the rechanneling procedure, wherein the receiver is muted during normal operation, wherein the transmitter transmits and is unmuted during the rechanneling procedure when the transmitter transmits.

15. The system of claim 9, wherein the system is a preexisting system that initially comprises the transmitter and modem, wherein the receiver is added to the preexisting system to enable receipt of the predetermined signal.

16. The system of claim 15, wherein the transmitter is one of a plurality of transmitters and the modem is on of one or more modems, wherein the receiver is configured to receive signals from each of the plurality of transmitters and enable the one or more modems to perform the determining and altering operations for the plurality of transmitters.

17. A method for improving linearization of a transmitter, comprising:
transmitting, using the transmitter, a predetermined pattern of symbols, the predetermined pattern of symbols being transmitted upon detection of a rechanneling procedure, the predetermined signal being generated by a modem that is electrically coupled to both the transmitter and a receiver;
receiving, using a receiver, the predetermined pattern of symbols transmitted by the transmitter; and
determining, using a modem, one or more differences between the transmitted predetermined pattern of symbols and the received predetermined pattern of symbols, the differences being in at least one of a phase and an amplitude of at least one of the symbols; and
determining, using the modem, one or more correction values based on the determined differences, wherein one or more symbols being transmitted over the transmitter are altered based on the determined differences to alleviate non-linearity caused by a power amplifier of the transmitter.

18. The method of claim 17, wherein the predetermined pattern of symbols is a predetermined pattern of QAM symbols, wherein the predetermined pattern of QAM symbols includes all QAM symbols in a QAM constellation.

19. The method of claim 17, wherein a communication system comprises the transmitter and modem, wherein the receiver is added to the communication system to enable receipt of the predetermined signal.

20. The method of claim 19, wherein the transmitter is one of a plurality of transmitters and the modem is on of one or more modems, wherein the receiver is configured to receive signals from each of the plurality of transmitters and enable the one or more modems to perform the determining operations for the plurality of transmitters.

* * * * *